United States Patent [19]

Sepp

[11] Patent Number: 4,550,336

[45] Date of Patent: Oct. 29, 1985

[54] PROGRESSIVE SCAN SPEED-UP PROCESSOR

[75] Inventor: Walter E. Sepp, Middlesex, N.J.

[73] Assignee: RCA Corporation, Princeton, N.J.

[21] Appl. No.: 526,701

[22] Filed: Aug. 26, 1983

[51] Int. Cl.[4] .............................................. H04N 5/02
[52] U.S. Cl. .................................... 358/11; 358/140; 358/12
[58] Field of Search ...................... 358/11, 12, 13, 14, 358/15, 16, 21 R, 64, 135, 140, 162, 166, 217, 242, 160, 141; 315/394

[56] References Cited

U.S. PATENT DOCUMENTS 4,400,719  8/1983  Powers ............................. 358/21 R
4,415,931  11/1983  Dischert ............................. 358/242

FOREIGN PATENT DOCUMENTS

WO82/01176  3/1983  PCT Int'l Appl. .
2000413  1/1979  United Kingdom .
2111343  6/1983  United Kingdom .
2111797  7/1983  United Kingdom .
2115643  9/1983  United Kingdom .

Primary Examiner—Michael A. Masinick
Attorney, Agent, or Firm—P. J. Rasmussen; P. M. Emanuel; R. G. Coalter

[57] ABSTRACT

A flat-field television image having reduced visibility of horizontal scan lines is generated by receiving first and second fields of interlaced video and progressively generating a scanned image within a time period for one incoming field. The progressively scanned image is formed from "real" and interpolated lines of luminance. In this arrangement a speed-up processor is provided for generating the high speed output. The speed-up processor incorporates an input sequence device, a storage device and an output sequence device. In the implementation the input sequence device rearranges the original data stream such that samples from the input data stream are stored in the rearranged sequence. The output sequence means selects the samples from the storage device such that the output samples are restored to their original sequence and provided at the faster rate.

11 Claims, 5 Drawing Figures

PROGRESSIVE SCAN SPEED-UP PROCESSOR

This invention relates to television systems and, more particularly, to television display apparatus for displaying a color television signal in a progressive scan format having an improved speed-up processor.

BACKGROUND OF THE INVENTION

In a copending U.S. patent application Ser. No. 526,700 entitled, "Progressive Scan Television Display System Employing Interpolation in the Luminance Channel" filed concurrently herewith in the name of D. H. Pritchard, a progressive scan television system is described. According to the Pritchard application, in the case of NTSC, 525 lines of the display are displayed in 1/60th of a second wherein alternate "real"0 and "interpolated" lines are successively displayed at some multiple (i.e., two-times) standard horizontal rate. During the next 1/60th of a second another 525 lines are displayed to complete a total frame time in 1/30th of a second, however, these second 525 lines are related to the first 525 lines such that in successive fields "interpolated" and "real" lines are displayed on top of each other. This progressive scan format results in the elimination of artifacts of "interline flicker" and "line break-up with motion" that exists in conventional two-to-one interlaced displays such as the NTSC system. The subjective effect of progressive scan is a flicker free, "smooth" or "quiet", picture presentation that is more pleasing to the viewer. The Pritchard application applies as well to other interlaced systems such as the 525/25 PAL system.

To perform progressive scanning as described in the aforementioned Pritchard application a speed-up processor is used for providing two horizontal lines of video during the time period of one horizontal line of incoming broadcast video signal. This speed-up processing requires that a line of video be written into memory in real time at a rate sufficient to sample the incoming video, i.e., at more than the Nyquist rate, and be readout of memory at some multiple of the input sample rate (generally, two-times). Such processing requires extremely high speed memories which are capable of operating at high sampling speeds, for example, 28 MHz for NTSC signals sampled at four-times color subcarrier. It is desirable to provide inexpensive speed-up processors which are capable of operating at these speeds without the use of memory elements which operate at extremely high speeds.

SUMMARY OF THE INVENTION

In accordance with the principles of the present invention a speed-up processor is provided which operates at the high speeds necessary to provide progressive scanning while using memory elements which are capable of operating at, for example, only half-speed.

In accordance with the principles of the present invention a color television system for producing a progressively scanned image comprises a source of television signals having a first data sequence and representing luminance and chrominance information of an image raster-scanned in an interlaced fashion. Time-compression means, coupled to the source of television signals, reduces the time duration of each line of said television signals by a first predetermined factor forming speeded-up television signals. The system also includes display means, coupled to receive the speeded-up television signals, for displaying, by progressive scanning, lines of video derived from the time-compression means. In accordance with a further aspect of the invention the time compression means includes an input sequence means, coupled to receive the source of television signals, for providing a data stream having a second data sequence rearranged from the first data sequence. A storage means, coupled to receive the data stream, is used to store the data stream in the rearranged second data sequence. Coupled to receive the data stream from the storage means is an output sequence means which restores the data stream to the first data sequence and provides the speeded-up television signals having the first data sequence to the display means.

DETAILED DESCRIPTION OF THE INVENTION

Figure 1:
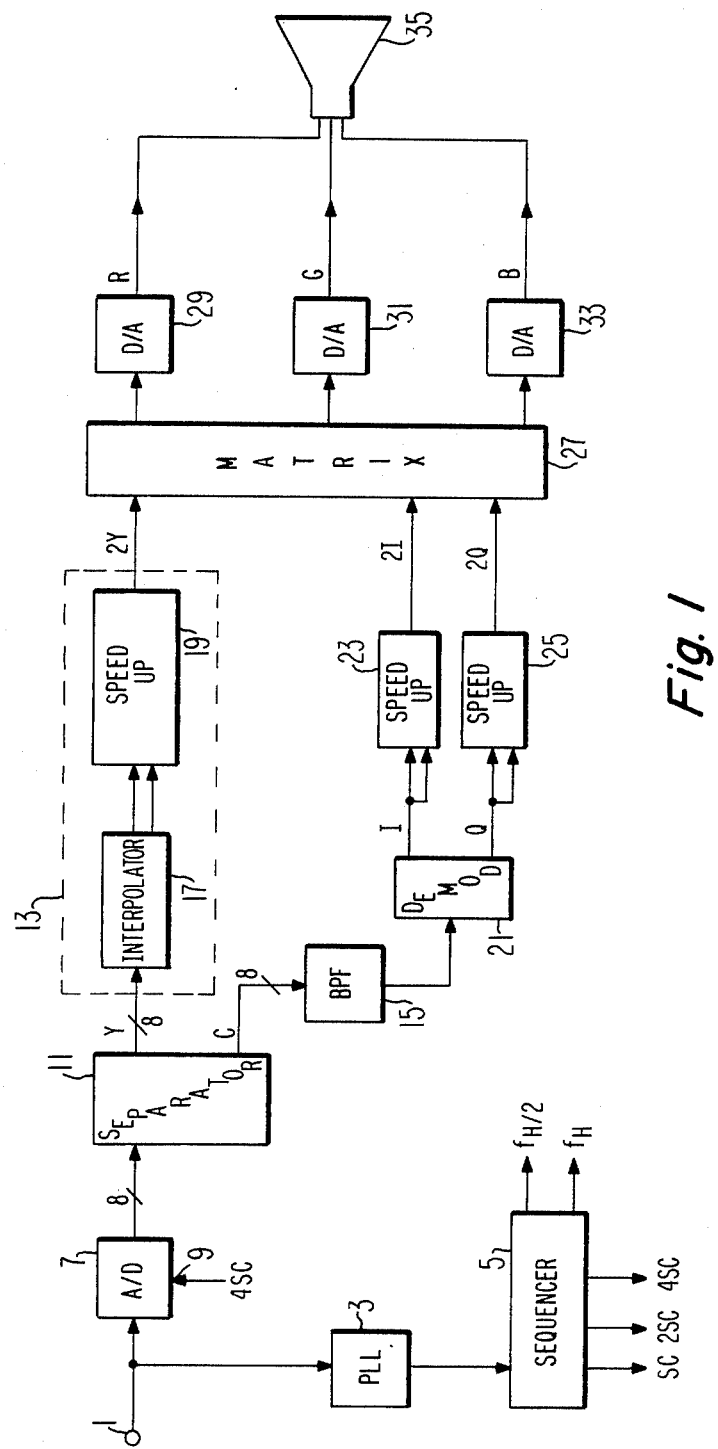
FIG. 1 is a block diagram of an embodiment of a progressive scan television receiver arranged in accordance with the principles of the present invention.

Referring to FIG. 1, an analog composite interlaced-scan color television signal is applied to terminal 1 from a source (not shown). The source of the analog signal may be the demodulated output of the intermediate-frequency (IF) stage of a standard television receiver. It should be noted that the present invention will be described with reference to an NTSC composite interlaced color television signal, however, it should be obvious to one of skill in the art that other composite, or component, interlaced color television systems, such as PAL, fall within the scope of the invention described herein. The composite signal is applied to phase-locked loops block 3 for deriving sync and clock signals for timing the various operations of the FIG. 1 arrangement. An NTSC signal has a bandwidth of 4.2 MHz. The signals from phase-locked loop 3 which may include, illustratively, some multiples of the 3.58 MHz color subcarrier and 15.7 KHz horizontal line sync signals, are applied to sequence timer 5 which provides timing signals to the various operations of FIG. 1 in the proper sequence and at the proper time for controlling the operation thereof. Sequencer 5 provides at least six timing signals: the horizontal line rate signal $f_H$ (illustratively, 15,734 Hz), the horizontal line rate divided by two, $f_H/2$, the color subcarrier signal (illustratively 3.58 MHz), two-times the color subcarrier signal, four-times the color subcarrier signal and eight times the color subcarrier signal.

Simultaneously, the composite signal from terminal 1 is applied to analog-to-digital converter 7 where it is converted to digital form under the control of a clock signal, for example, four-times the subcarrier (4 sc), applied to terminal 9 from sequencer 5. The digital signal from analog-to-digital converter 7 is a sequence of 8-bit numbers representative of the analog value of the composite signal. The digitized composite video signal is applied to separator 11 (illustratively, a comb filter having a 1-H delay line having additive and subtractive outputs) which separates the luminance signal (Y) and the chrominance signal (C) from the composite signal and applies them to speed-up processor 13 and bandpass filter 15 which is implemented by digital techniques, respectively. The speed-up processor 13 includes interpolator 17 and speed-up block 19. Interpolator 17 is a two-point interpolator for providing an estimate of the interstitial lines by forming an average of the signal value of the signal from two adjacent lines of incoming video. Interpolator 17 produces a succession of simultaneous lines of interpolated video-and passes through lines of unmodified video. The interpolated video is the sum (including some weighting factor to form an average value) of the current video line (unmodified) and a delayed video line which has been delayed for one horizontal line (the time for one horizontal line is about 63 μs according to NTSC). The unmodified and interpolated video is applied to speed-up block 19 where it is increased in speed by a predetermined factor (generally, two-times). That is, in speed-up block 19 the incoming video is written in at real time at the incoming sample rate and readout at twice the incoming sample rate. This double-rate operation during read-out increases the bandwidth of the signal by a factor of two thus decreasing the time duration of the incoming signals by one-half. Consequently, each line of video which normally occurs in approximately 63 μs and which is written into speed-up processor 19 in 63 μs is read-out of speed-up processor 19 in about 31.5 μs. In general, the video is clocked-in at four-times the color subcarrier rate (4 sc) and read-out at eight times subcarrier rate (8 sc). The output of speed-up processor 13 is a continuous luminance signal at twice the input rate having horizontal lines which alternate between unmodified and interpolated. The operation of speed-up processor 13 will be explained in more detail with reference to FIG. 2.

In the arrangement of FIG. 1 the chrominance information is not interpolated as suggested in the previously mentioned Pritchard application. It should be understood, however, that the chrominance information could be interpolated. The chrominance signal from bandpass filter 15 is applied to demodulator 21. Demodulator 21 provides the demodulated I and Q signals to speed-up processors 23 and 25, respectively. The speed-up processors 23 and 25 produce time-compressed I and Q signals compressed at a multiple (e.g., two-times) of the input rate. Speed-up processors 23 and 25 may be implemented by the technique described in the aforementioned Pritchard application. Further these speed-up processors could be implemented by the multiplexing techniques of FIG. 2. The twice rate I and Q signals are provided to matrix 43 along with the twice rate luminance signal from speed-up processor 13.

The separate double-rate Y, I and Q signals are matrixed in matrix circuit 27 which generates twice-rate red (R), green (G), blue (B) signals. The R, G and B signals which are digitized are applied to digital-to-analog converters 29, 31 and 33, respectively, to produce R, G and B analog output signals. The R, G and B analog signals at the output of D-to-A's 29, 31 and 33, which are two-times the bandwidth of standard definition signals, are applied to a display unit 35 including a kinescope operated at, illustratively, a 31.5 KHz rate for scanning a total of 525 lines in a progressive scan manner. Thus, the bandwidth of NTSC is increased from 4.2 to 8.4 MHz.

Thus, the arrangement of FIG. 1 produces and displays 525 lines of progressively scanned or non-interlaced video for each 262½-line field of interlaced incoming video. Such an image more closely approximates the appearance of a flat-field display (a display not having subjectively visible scan lines).

The arrangement of FIG. 1 provides two-point interpolation and double-rate translation in the luminance channel plus double-rate translation (no interpolation) in the chrominance channel. The luminance signal alternates between a doubled-in-speed, interpolated line and a "real" double-in-speed line. The demodulated chrominance components are individually doubled-in-speed and matrixed with luminance at two-times rate to form the two-times rate R, G and B component signals to operate a display whose horizontal scan rate has been doubled (illustratively, increased from 15,734 Hz to 31,468 Hz).

Figure 2:
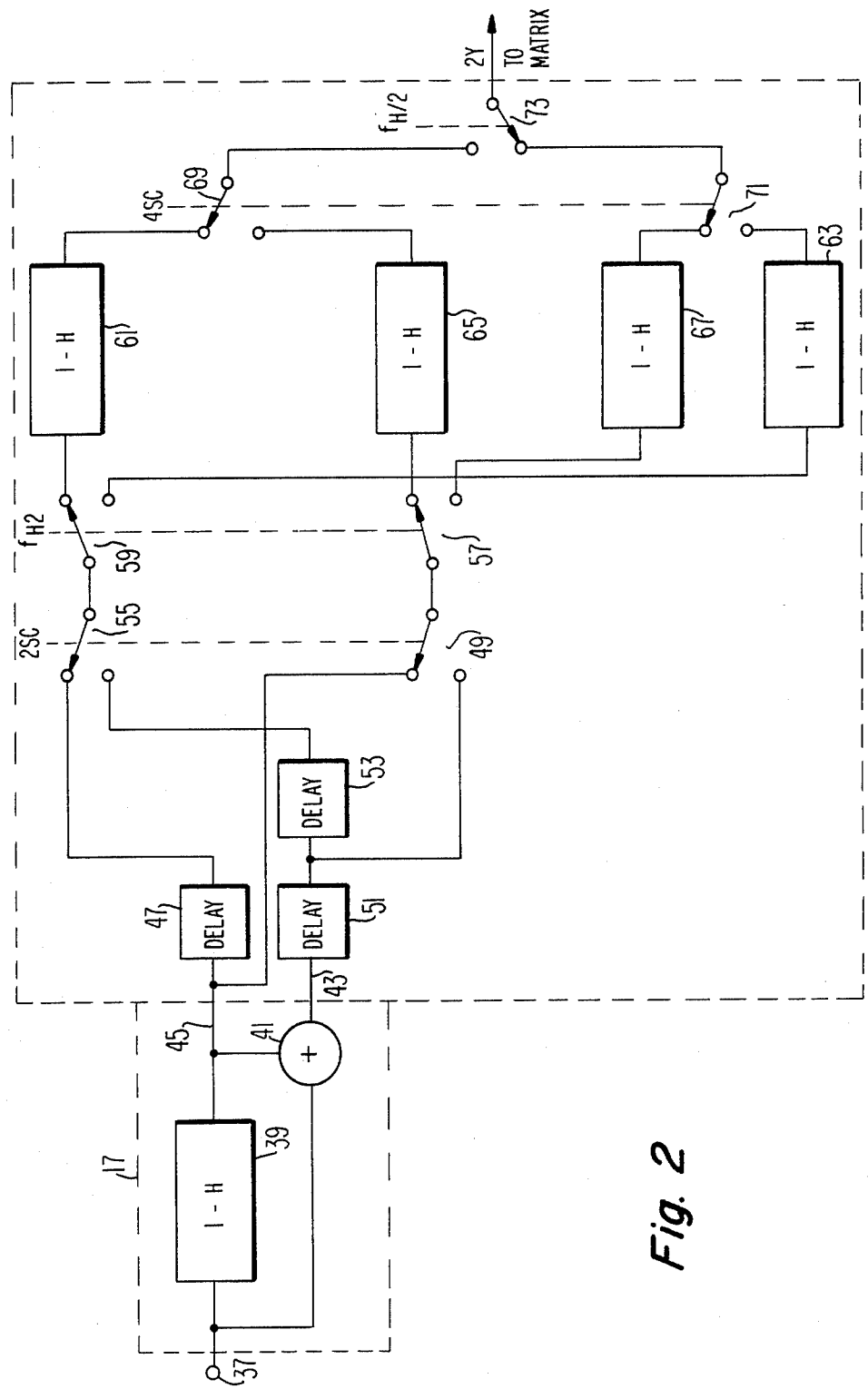
FIG. 2 shows a block diagram representation of the speed-up processor of FIG. 1 arranged in accordance with the principles of the present invention.

Referring to FIG. 2, the details of the speed-up processor of FIG. 1 will be provided. In the Figures, elements designated with like reference numerals are the same or similar items in the various Figures. The luminance signal from separator 11 of FIG. 1 is applied to terminal 37 of speed-up processor 13. The digitized luminance signal is applied to interpolator 17 which produces interstitial estimated lines and delayed unmodified lines for application to two-times speed-up block 19. Interpolator 17 comprises 1H delay 39 and adder 41. Interpolator 17 is a two-point interpolator for providing an estimate of the interstitial line by forming an average of the signal value of the signal from two adjacent incoming lines. Interpolator 13 produces a succession of simultaneous lines of interpolated video via conductor 43 and delayed, unmodified video via conductor 45. The interpolated video is the sum (including some weighting factor, e.g., one-half, to form an average value) of the current video line and the delayed video line which has been delayed by the 1H delay 39, i.e., delayed for the time of one horizontal line which is about 63 microseconds in an NTSC system. The delayed unmodified video is applied simultaneously to delay element 47 and to one pole of double-pole single-throw switch 49. The interpolated video from adder 41 is applied via conductor 43 to delay element 51. The output from delay element 51 is applied simultaneously to delay element 53 and to the other pole of switch 49. Delay elements 47, 51 and 53 which illustratively may be flip-flops have a delay time equal to the time of one video sample at the digitized rate, for example, in an NTSC system sampled at four-times the subcarrier rate the delay through delays 47, 51 and 53 would be approximately 70 ns. The outputs from delay elements 47 and 53 are applied to respective poles of double-pole single-throw switch 55. The outputs from switches 49 and 55 are applied to double-pole single-throw switches 57 and 59, respectively. One pole of switch 59 is applied to 1H delay line 61 and the other pole to 1H delay line 63. In a similar manner the poles of switch 57 are connected to 1H delay lines 65 and 67, respectively. Illustratively, 1H delay lines 61–67 may be implemented using RAM-type devices being one sample wide and 1,024 samples long. For NTSC, which has 910 samples per horizontal line, a 1H delay line 1,024 samples long provides sufficient storage. The outputs from 1H delay lines 61 and 65 are connected to respective poles of single-throw double-pole switch 69, while the outputs of 1H delays 63 and 67 are applied to respective poles of single-throw double-pole switch 71. The outputs from switches 69 and 71 are applied to respective poles of double-pole single-pole switch 73 whose output is in turn applied to the matrix circuit of FIG. 1. Switches 49, 55, 57, 59, 69, 71 and 73 may be implemented with fast logic circuits capable of operating at speeds as high as 28 MHz.

Figure 3:
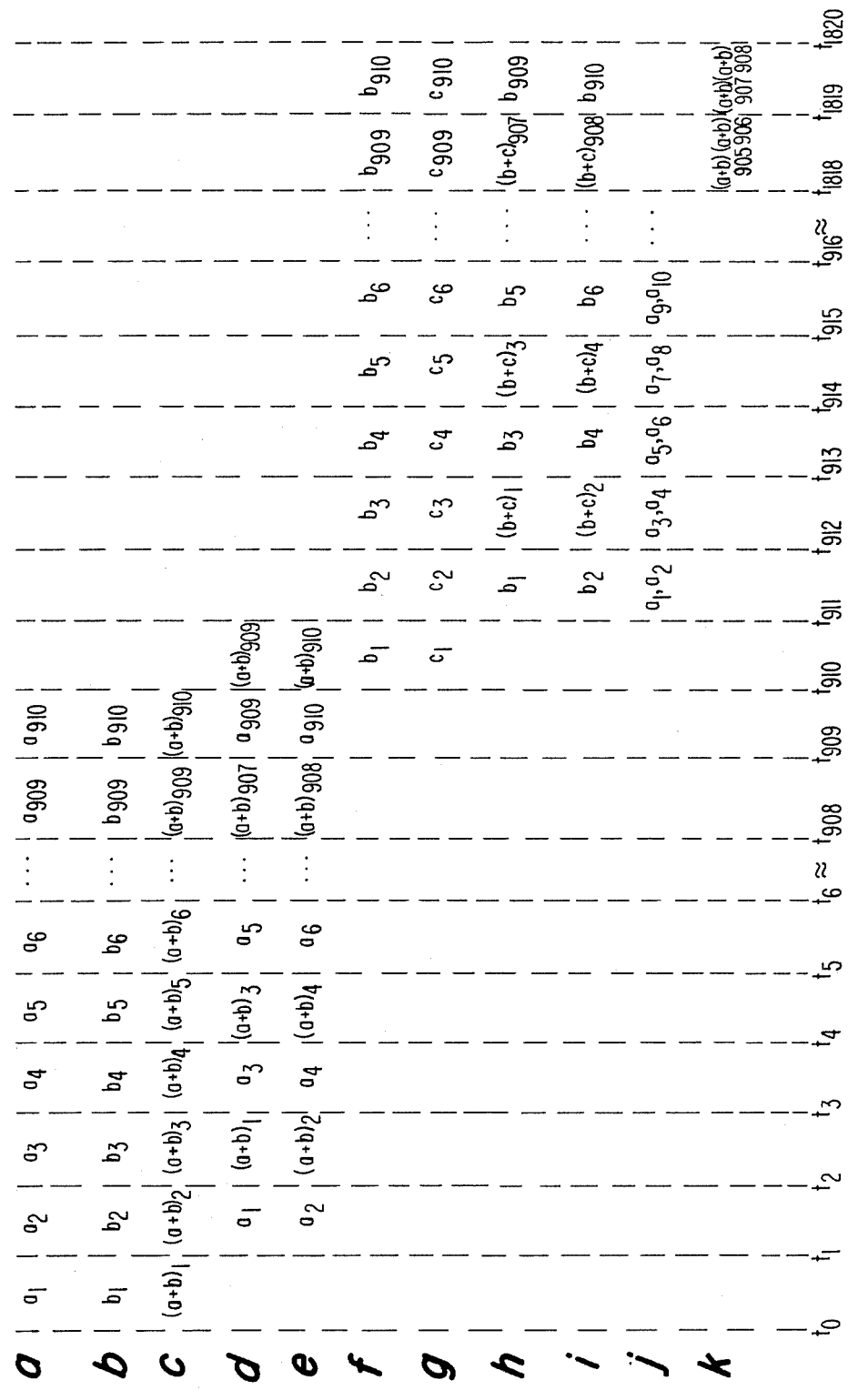
FIG. 3 is a timing diagram for use in explaining the timing of the signals through the speed-up processor.

The operation of two-times speed-up block 19 of FIG. 2 will now be described with reference to the timing diagram of FIG. 3. FIGS. 3a and 3b show the sequence of picture elements (pixels) at the output and input of 1H delay 39, respectively. That is, during the time period $t_0$–$t_1$ pixels $a_1$ and $b_1$ from lines a and b, respectively of a first television field scanned in an interlaced manner are present at the output and input of delay 39, during the time period $t_1$–$t_2$ pixels $a_2$ and $b_2$ are present, and during $t_2$–$t_3$ pixels $a_3$ and $b_3$ are present, and so on. During the time period $t_{909}$ to $t_{910}$ pixels $a_{910}$ and $b_{910}$ are present. FIG. 3c shows the output sequence of pixels for the time period $t_0$–$t_{910}$ for a horizontal line on conductor 43, output of adder 41. That is, for the time period $t_0$–$t_1$, $(a+b)_1$ is present at the output of adder 41, for the time period $t_1$–$t_2$, $(a+b)_2$ is present and so forth. During the time period $t_{909}$–$t_{910}$ $(a+b)_{910}$ is present. Of course it should be noted that some weighting function is performed in adder 41 such that the output from adder 41 is a weighted addition of the pixel values from video lines a and b. Further, it should be noted that other interpolation schemes may be used, for example, a geometric mean, root-mean-square, etc. Assume that 1H delays 67 and 63 are filled with previous unmodified and interpolated lines and are being read-out by switches 71 and 73 while the delayed (a) line and the summed (a) and (b) line are being loaded into 1H delays 61 and 65 at the incoming rate. Switches 49 and 55 operate at one-half the sample rate, for example, in an NTSC system at two-times the color subcarrier rate so that they dwell at one pole of the respective switches for the time period of one pixel sample and dwell at the other pole for the time period of a time successive pixel sample. Switches 57 and 59, on the other hand, operate at a rate equal to one-half of the horizontal line rate, for example for NTSC at 15,734/2Hz. Assume further that switches 55 and 49 are positioned to pass the information from delay 47 and conductor 45, respectively, and switches 59 and 57 are positioned to input data to 1H delays 61 and 65, respectively. Also assume that the first sample of the (a) video line, i.e., $a_1$, is at the output of delay 47 and the second sample, i.e., $a_2$ is at the input. Simultaneously the output of delay 51 is the sample $(a+b)_1$ and the input is $(a+b)_2$. Referring to FIGS. 3d and 3e which represents the inputs to delay elements 61 and 65, respectively, $a_1$ and $a_2$ are input to respective delay elements 61 and 65 during the time period $t_1$–$t_2$. During the next time period, i.e., $t_2$–$t_3$, switches 55 and 49 are switched to permit samples $(a+b)_1$ and $(a+b)_2$ which have shifted to the output and input of delay 53, respectively, are passed to delays 61 and 65, respectively. Thus, the sequence of samples shown in FIGS. 3d and 3e represent the sequence of samples being clocked into 1H delays 61 and 65, respectively. According to this sequence, the input pixel sequence is being altered such that sequential pixels from interpolated and delayed lines are being stored in a parallel format in delay element 61 and 65. FIGS. 3f and 3g show the sequence of pixels for the time period $t_{910}$–$t_{1820}$ for the next pair of lines at the output and input of 1-H delay 39, respectively. The (b) video line has been delayed by one line time and the (c) video line is current. The information to be clocked into delays 63 and 67 is the delayed (b) line and the interpolated (b) and (c) lines. During the time period $t_{911}$–$t_{1820}$ switches 59 and 57 are switched to pass the pixel samples into delays 63 and 67, respectively, in the sequence as shown in FIGS. 3h and 3i. During the time period $t_{910}$–$t_{1820}$, while delay lines 63 and 67 are being written into, the information previously stored in delay lines 61 and 65 is read-out via switches 69 and 73 to the matrix of FIG. 1. Switches 69 and 71 which are used to read-out the information from delays 61, 65, 63 and 67 are operated at a sample rate which is equal to two-times the input rate, for example, in an NTSC system at four-times the color subcarrier rate. Thus, switches 69 and 71 reside at each pole for a period of time equal to one-half of an input pixel, approximately 35 ns, switch 73 is switched at the rate of one-half the horizontal line rate to pass two horizontal lines to the matrix in the time period that it took to write-in one horizontal line, for example, in an NTSC system switch 73 would reside on each pole for a period of time approximately equal to 63 $\mu$s. The output sequence from delay lines 61 and 65 via switches 69 and 73 to the matrix of FIG. 1 is shown by the sequence of FIGS. 3j and 3k. As can be seen the original sequence has been restored such that video line (a) is output from delay 61 and 65 in the sequence in which it was originally transmitted and the interpolated line is restored to its original sequence. Furthermore, the switching is performed such that two pixel samples are output for a time period equivalent to one pixel sample time period on input.

In the implementation of the two-times speed-up block 19 of FIG. 2, the four 1H delays may be provided having TTL-type logic to provide a two-times speed-up at video sample frequencies. The input sequence into any pair of 1H delays is the first sample from a delayed line followed by a first sample from the interpolated line. Simultaneously, second sample from the delayed line is loaded with the first sample from the delayed line and the second sample from the interpolated line with the first sample from the interpolated line. This input sequence requires that the devices be RAM-type devices which may be addressed so that the original input sequence may be restored on the output. This permits a storage device which can operate at only one speed, for example, address no faster than 70 ns, to provide an output stream that is twice as fast, for example, at 35 ns. The combination of the storage devices and output switches thus effect a speed-up operation since the output switch resides at each pole for the shortened period while the data at each pole is present for the longer period. The arrangement described herein, in general, permits high speed operation with a minimum number of devices which are not necessarily capable of operating at the output speed desired.

It should be noted that the description with respect to FIGS. 1 and 2 has been described for 1-bit of information. In general, for an 8-bit system there would be eight parallel tracks from the A-to-D device 7 to the D-to-A devices 29, 31 and 33 of FIG. 1.

Figure 4:
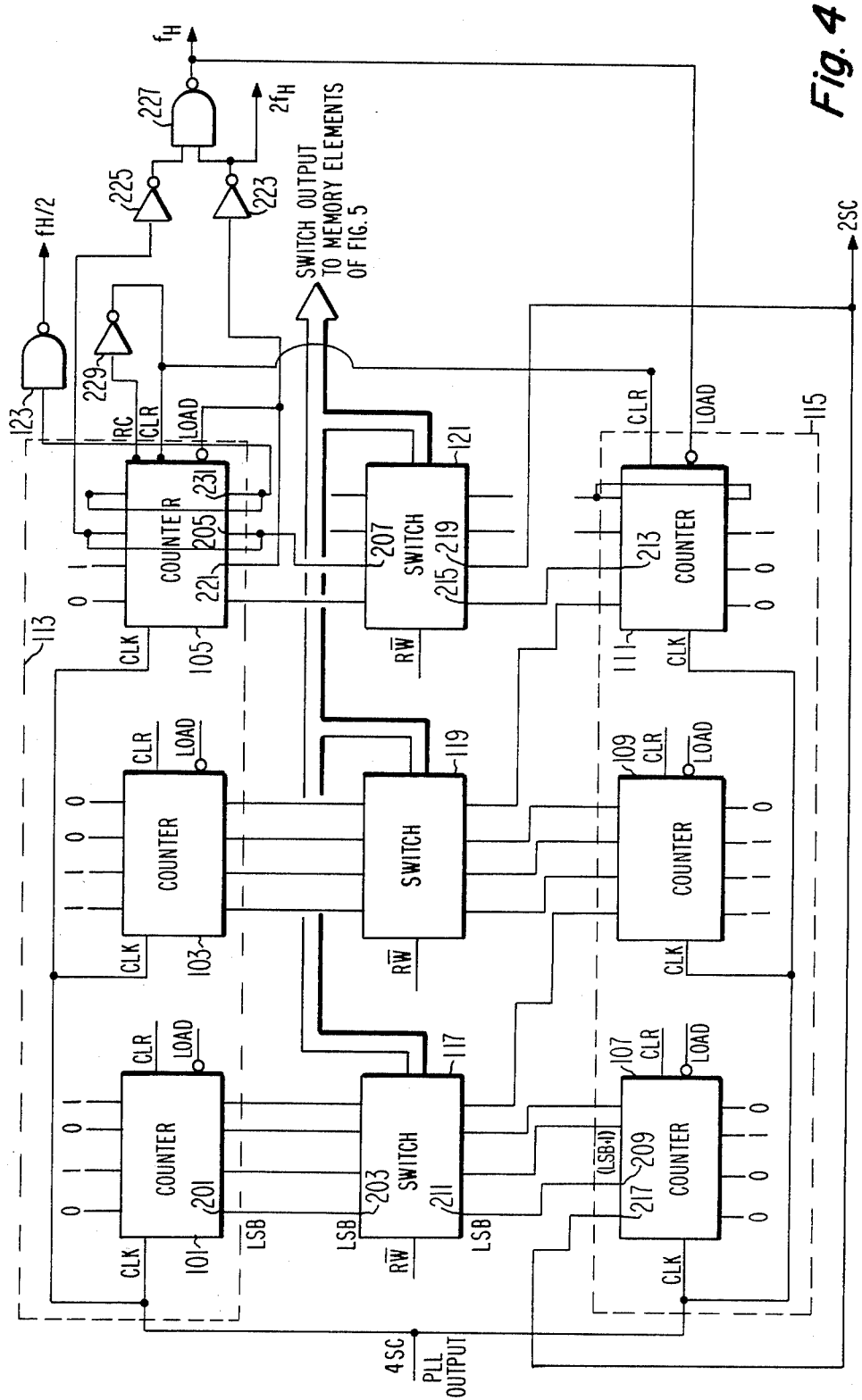
FIG. 4 shows a hardware implementation of the timing sequencer of FIG. 1 in accordance with the principles of the present invention.

The operation of sequence timer 5 will now be described with reference to FIGS. 4 and 5. Referring to FIG. 4 a description of the switch and counter arrangement used for addressing the memory elements on input (write) and output (readout) is shown. A first set of three counters 101, 103 and 105 have their clock inputs connected to the output of phase-locked loop 3 of FIG. 1 which provides a clock signal having a rate equal to the sampling rate of the input video, i.e., four-times the color subcarrier (4 sc). A second set of three counters 107, 109 and 111 also have their clock inputs connected to this clock signal. In the arrangement shown in FIG. 4 counters 101-111 are implemented using four-bit counters which count in binary from 0000 to 1111. Illustratively, counters 101-111 are SN 74S163 which are manufactured by Motorola, Texas Instruments and others. The counters 101, 103 and 105 and counters 107, 109 and 111 are connected, respectively, in serial to permit addressing 1024 memory locations in a memory element. It should be noted for this application that there are 910 pixels in one horizontal line of television signal. Thus, the counters are setup such that they count through 910 states. Counters 101, 103 and 105 comprise the output (readout) counter chain 113 used for addressing the memory elements while counters 107, 109 and 111 comprise the input (write) counter chain 115. The counter output from counter chain 113 is coupled to switches 117, 119 and 121 such that the least significant bit (LSB) terminal 201 of the counter chain of counter 113 is coupled to the LSB input terminal 203 of switch 117 and the most significant bit (MSB) terminal 205 of the counter chain of counter 113 is coupled to the MSB, terminal 207, of switch 121. On the other hand, the LSB+1, terminal 209, of counter chain 115 is connected to a LSB input, terminal 211, of switch 117 and the MSB output terminal 213 of counter chain 115 is connected to the MSB−1 input terminal 215 of switch 121. The LSB output of counter chain 115 terminal 217 is connected to the MSB input, terminal 219, of switch 121 and provides timing for various functions, for example, switches 55 and 49 of FIG. 2 and any other inputs requiring a count at the rate of 2 sc. Switches 117, 119 and 121 may be implemented using quad 2-input multiplexers (illustratively, the quad 2-input multiplexers maybe Motorola SN54S157 devices). Terminal 221 from counter 105 outputs a pulse once every 455 clock cycles, i.e. at 31.5 KHz rate ($2f_H$). This pulse is used to load counter chain 113 with a predetermined number and provides a $2f_H$ signal for providing horizontal synchronizing pulses to the high definition television display. The pulse from terminal 221 having appropriate polarity as provided by inverter 223 is anded with the output from terminal 205 having appropriate polarity provided by inverter 225 and inverted in NAND gate 227 to provide a pulse stream at an $f_H$ rate (i.e., 15.7 KHz). The output from NAND gate 227 is connected to the load inputs of counters 107, 109 and 111 to load a predetermined count therein. The ripple carry output RC of counter 105 is coupled via inverter 229 to the clear CLR input of all the counters in chains 113 and 115 to clear the counters at an $f_H/2$ rate.

Terminal 231 (the 1820 count) from counter chain 113 via NAND gate 123 provides a timing output which is equal to the input clock signal divided by 1820, i.e., $f_H/2$. The output from NAND gate 123 is coupled to respective inputs RW of switches 117, 119 and 121 to effect either a writing or reading sequence in the memory elements, i.e., depending upon the state of the input to terminal RW either the count from counter chain 113 or counter chain 115 will be output to the memory elements of FIG. 5.

In operation, a master clear signal from output RC of counter 105 is inverted and input to clear all counters. The presence of a low state on terminal 221 will load a predetermined count into counter chain 113 and every other low state on terminal 221 will load a predetermined count into counter chain 115. The predetermined count permits the counters to count 910 cycles which represents the number of pixel samples in one horizontal television line counting from the predetermined count to the terminal count. Thus, each horizontal line sequence uses a load signal to preset the counters to the predetermined value, illustratively, counter chain 113 is preset to 0101110001 and counter chain 115 to 00101110001. For the write sequence, switches 117, 119 and 121 are enabled to clock the counter output from counter chain 115 to the memory elements and for the readout sequence they are enabled to clock the counter output from counter chain 113 to the memory elements. Thus, the memory elements are alternately written into and read-out of under the control of the counters and switches of FIG. 4. One arrangement of counters and switches would require two sets of input and output counter chains along with their respective switch set. In another arrangement, two sets of switches may be coupled to the output of the counter chain sets to provide address information, i.e., one counter set and two switch sets, thus saving an input and output counter chain. For simplicity the invention will be described with reference to the former arrangement but a more economical use of hardware would use the latter.

Figure 5:
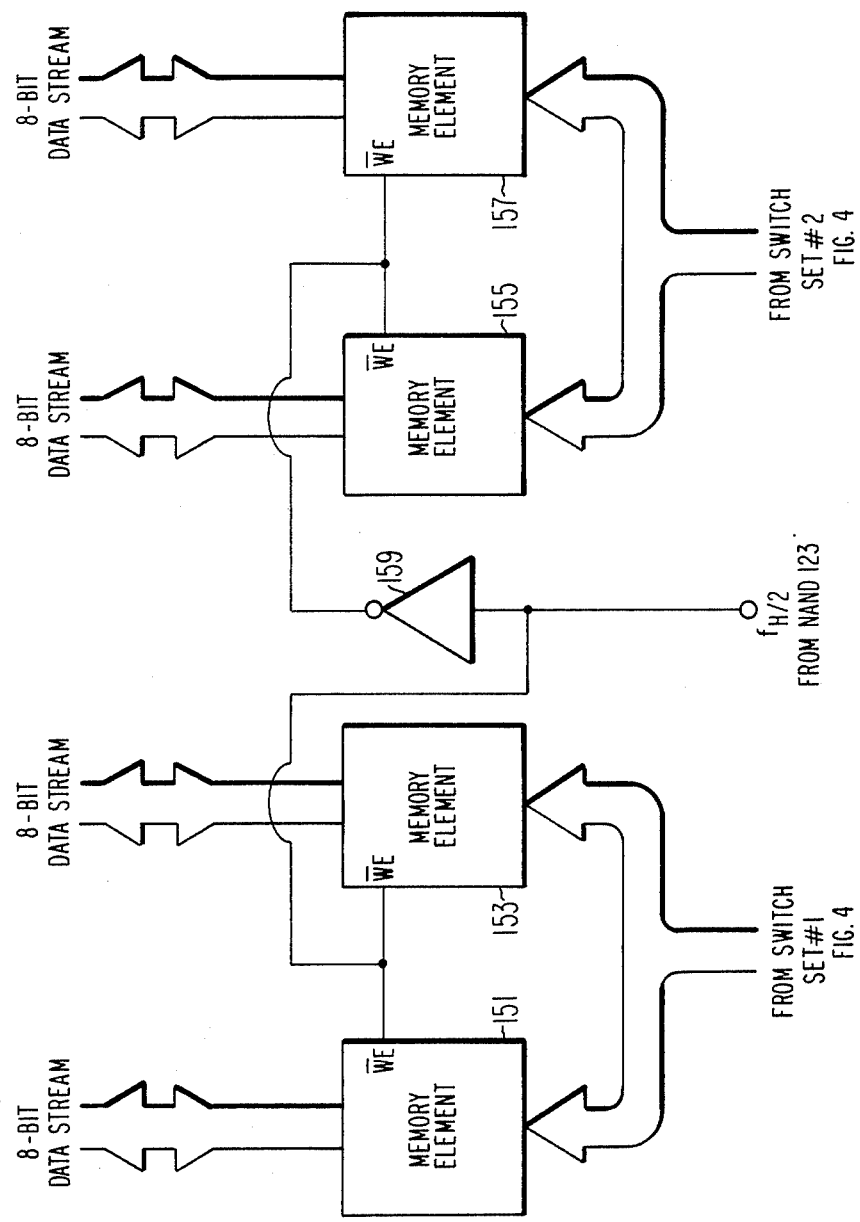
FIG. 5 shows further details of one embodiment of the memory elements of FIG. 2.

Referring to FIG. 5, a description of how the pixel data is written into and read-out of the memory elements will be described. Memory elements 151, 153 are connected to a first switch set which provides address information from one set of counters according to the arrangement shown in FIG. 4 while memory elements 155 and 157 are connected to a second switch counter set which may be implemented by the arrangement shown in FIG. 4. Memory elements 151, 153, 155 and 157 correspond to 1-H delay elements 61, 65, 67 and 63, respectively, of FIG. 2, however, rather than being 1024 elements in length and one-bit deep delay they are 1024 elements in length, eight-bits deep. In other words, memory elements 151-157 describe a system for storing an eight-bit pixel word. Illustratively, memory elements 151-157 may be implemented using two 1024×4 Bit Static RAM devices manufactured by Intel as Model No. 2149H-2. The write enable input of memory elements 151 and 153 is provided via NAND gate 123 of FIG. 4 while the write enable input of memory elements 155 and 157 is provided from the same input having opposite polarity via inverter 159. The eight-bit input data stream via switches 59 (i.e., in an eight-bit arrangement there are eight switches) of FIG. 2 and the eight-bit output data stream via switches 69 (8) of FIG. 2 are coupled to memory element 151; the input data stream from switches 57 (8) and the output data stream to switches 69 (8) are coupled to memory element 153; the input data stream from switches 57 (8) and the output data stream to switches 71 (8) are coupled to memory element 155; and the input data stream from switches 59 (8) and the output data stream to switches 71 (8) are coupled to memory element 157.

The operation of FIGS. 4 and 5 will be described with reference to FIG. 3. FIG. 3d shows the pixel sequence written into memory element 151 during the time period $t_1$ to $t_{911}$ as was described above. During that same time interval, i.e., $t_1$ to $t_{911}$ the pixel sequence, shown in FIG. 3e, is written into memory element 153. During this time interval the write enable input of memory elements 151 and 153 is enabled. Simultaneously during the time interval $t_1$ to $t_{911}$ the information which was previously stored in memory elements 155 and 157 is readout via the output switches at twice the input rate. During the next time interval, i.e., $t_{911}$–$t_{1820}$ the pixel sequence shown in FIGS. 3h and 3i are read into memory elements 155 and 157, respectively. During this time interval the write enable input of memory elements 155 and 157 is enabled. During the time interval, $t_{911}$ to $t_{1821}$ memory elements 151 and 153 are readout via the switches of FIG. 2 at a rate of twice the input rate and shown as the pixel sequence of FIGS. 3j and 3k. During the readout sequence the write enable input of memory elements 151 and 153 is disabled and correspondingly during a readout sequence of memory elements 155 and 157 their respective write enable inputs are disabled. During the next time interval the next pixel sequence via switches 57 and 59 is read into memory elements 151 and 153 while the pixel sequence as shown in FIGS. 3j and 3k are readout in the original pixel sequence at twice the write-in rate.

Further, it should be noted that the arrangement as described herein of interpolating from two adjacent lines of video may effect some loss of vertical detail on transitions from one line to the next. This loss of vertical detail may be restored in a manner as described in co-pending U.S. patent application Ser. No. 526,702 filed in the name of D. H. Pritchard et al.

In one arrangement of the invention the outputs from one of the counter chains of FIG. 4 may be used for addressing the memory elements in the interpolator.

What is claimed is:

1. In a color television sytem for producing a progressively scanned image, an apparatus comprising:
   a source of television signals, having a first data sequence, representing luminance and chrominance information of an image raster-scanned in an interlaced fashion;
   time-compression means coupled to said source of television signals for reducing the time duration of each line of said television signals by a first predetermined factor forming speeded-up television signals; and
   display means, coupled to receive said speeded-up television signals, for displaying, by progressive scanning, lines of video derived from said time-compression means;
   wherein said time-compression means includes:
   input sequence means coupled to receive said source of television signals for providing a data stream having a second data sequence rearranged from said first data sequence;
   storage means, coupled to receive said data stream, for storing said data stream in said rearranged second data sequence; and
   output sequence means coupled to receive said data stream from said storage means for restoring the data stream to said first data sequence and for providing said speeded-up television signals, having said first data sequence, to said display means.

2. The apparatus according to claim 1 wherein said first predetermined factor is two.

3. The apparatus according to claim 2 wherein said first data sequence is a succession of signal samples from first and second lines of television signals and wherein said second data sequence includes a first succession of alternate odd signal samples from said first line intermingled with a second succession of alternate odd signal samples from said second line.

4. The apparatus according to claim 3 wherein the bandwidth of said source of television signals is approximately 4.2 MHz and the bandwidth of said speeded-up television signals is approximately 8.4 MHz.

5. In a color television system for producing a progressively scanned image, an apparatus comprising:
   a source of television signals, having a first data sequence, representing luminance and chrominance information of an image raster-scanned in an interlaced fashion;
   time-compression means coupled to said source of television signals for reducing the time duration of each line of said television signals by a first predetermined factor forming speeded-up television signals; and
   display means, coupled to receive said speeded-up television signals, for displaying, by progressive scanning, lines of video derived from said time-compression means;
   wherein said time compression means includes:
   a first switch means, coupled to receive said first data sequence, for rearranging said first data sequence into a data stream having a second data sequence;
   storage means, coupled to receive said data stream, for storing said data stream having said second data sequence; and
   a second switch means, coupled to receive said data stream having said second data sequence, for rearranging said television signal sequence and for providing said speeded-up television signals to said display means.

6. The apparatus according to claim 5 wherein said first predetermined factor is two.

7. The apparatus according to claim 6 wherein said first data sequence is a succession of signal samples from first and second lines of television signals and wherein said second data sequence includes a first succession of alternate odd signal samples from said first line intermingled with a second succession of alternate odd signal samples from said second lines.

8. The apparatus according to claim 7 wherein the bandwidth of said source of television signals is approximately 4.2 MHz and the bandwidth of said speeded-up television signals is approximately 8.4 MHz.

9. In a color television system for providing a progressively scanned image, an apparatus comprising:
   a source of television signals, having a first data sequence, representing luminance and chrominance information of an image raster-scanned in an interlaced fashion;
   interpolating means coupled to receive said television signals for generating simultaneously lines of first signals in said first data sequence representative of an estimate of signals which would represent the image between time-successive lines of the signals of said source of television signals and lines of second signals which represent one of said time-successive lines;
   time-compression means, coupled to receive said lines of said first and second signals, for reducing the time duration of each of said lines by a first predetermined factor forming speeded-up television signals; and
   display means, coupled to receive said speeded-up television signals, for displaying, by progressive scanning, said lines of speeded-up television signals from said time-compression means;
   wherein said time compression means includes:

a first signal path for providing lines of said second signals;

a second signal path for providing lines of said second signals delayed from said signals in said first signal path by a time period equal to a pixel sample period;

a third signal path for providing lines of said first signals delayed from said signals in said first signal path by a time period equal to a pixel sample period;

a fourth signal path for providing lines of said first signals delayed from said signals in said first signal path by a time period equal to two-times a pixel sample period;

first switch means, coupled to receive said signals from said second and fourth signal paths for providing a first stream of signals alternating between said signals from said second and fourth signal paths;

second switch means, coupled to receive said signals from said first and third signal paths for providing a second stream of signals alternating between said signals from said first and third signal paths;

a first pair of line stores for receiving first pair of lines of said first and second streams of signals a second pair of lines stores for receiving second pair of lines of said first and second streams of signals; and third switch means, coupled to receive the signals from said first and second pairs of line stores, for rearranging the signals from said first and second pairs of line stores to reestablish said first data sequence and for providing said rearranged signals at said speeded-up rate.

10. The apparatus according to claim 9 wherein said first predetermined factor is two.

11. The apparatus according to claim 10 wherein the bandwidth of said source of television signals is approximately 4.2 MHz and the bandwidth of said speeded-up television signals is approximately 8.4 MHz.

* * * * *